United States Patent [19]

Min

[11] Patent Number: 4,888,395

[45] Date of Patent: Dec. 19, 1989

[54] CORE/SHELL POLYMERS AND IMPROVED SEALABLE ARTICLES TREATED WITH THE SAME

[75] Inventor: Taeik Min, Pittsford, N.Y.

[73] Assignee: Mobil Oil Corporation, New York, N.Y.

[21] Appl. No.: 69,047

[22] Filed: Jul. 2, 1987

[51] Int. Cl.$^4$ .............................................. C08F 279/02
[52] U.S. Cl. .................................... 525/301; 525/291; 525/309; 525/310; 525/317
[58] Field of Search ............... 525/301, 902, 291, 309, 525/310, 317; 428/500, 511, 515, 516, 517, 518

[56] References Cited

U.S. PATENT DOCUMENTS

| | | | |
|---|---|---|---|
| 3,291,768 | 12/1966 | Pfluger et al. | 428/511 |
| 3,661,994 | 5/1972 | Hwa et al. | 525/232 |
| 3,985,703 | 10/1976 | Ferry et al. | 525/902 |
| 4,002,801 | 1/1977 | Knechtges et al. | 428/474 |
| 4,375,532 | 3/1983 | Baer | 525/902 |
| 4,385,152 | 5/1983 | Boyack et al. | 525/301 |
| 4,403,464 | 9/1983 | Duncan | 428/518 |
| 4,421,901 | 12/1983 | Lindner et al. | 525/902 |
| 4,468,498 | 8/1984 | Kowalski et al. | 525/902 |
| 4,469,825 | 9/1984 | Kowalski et al. | 525/902 |
| 4,504,624 | 3/1985 | Heuschen et al. | 525/902 |
| 4,717,750 | 1/1988 | Makati et al. | 525/902 |

OTHER PUBLICATIONS

"Morphology and Grafting in Polybutylacrylate-Polystyrene Core-Shell Emulsion Polymerization", Journal of Polymer Science: Polymer Chemistry Edition, vol. 21, pp. 2845-2861 (1983).

*Primary Examiner*—Allan M. Lieberman
*Attorney, Agent, or Firm*—Alexander J. McKillop; Charles J. Speciale; James P. O'Sullivan

[57] ABSTRACT

Core/shell polymers containing a rubber-core and a thermoplastic shell acrylate-vinylacetate-acrylic terpolymer having excellent cold seal strength properties.

8 Claims, No Drawings

CORE/SHELL POLYMERS AND IMPROVED SEALABLE ARTICLES TREATED WITH THE SAME

BACKGROUND OF THE INVENTION

This invention relates to core/shell polymers and more particularly to core/shell polymers containing a rubber-core and an acrylic-vinylacetate terpolymer shell having excellent cold seal strength properties.

The control of latex particle morphology by seeded emulsion polymerization is well known. For example, U.S. Pat. No. 3,985,703 discloses certain acrylic core/shell polymers containing a high percentage of rubbery phase.

U.S. Pat. No. 4,375,532 discloses a multiphase core/shell polymer comprising a crosslinked elastomer core and a rigid thermoplastic polymer shell having a glass transition temperature of at least about 35° C. comprising a mono alkyl maleate or fumarate, styrene and optionally a monomer selected from the group consisting of $C_1$ to $C_8$ alkyl acrylates and methacrylates, acrylonitrile and methacrylonitrile. The patentee states that these multiphase core/shell polymers are useful for blending with polyamides to provide toughened polyamide compositions.

U.S. Pat. No. 4,002,801 discloses a core/shell polymer comprised of a core of polyvinyl chloride and a shell on said core containing in polymerized form, one or more polymerizable monomers selected from the group consisting of $\alpha,\beta$-olefinically unsaturated carboxylic acids and their N-alkylol and N-alkoxyalkyl derivatives, acrylic and methacrylic acids and esters derived therefrom. The patentee states that by coating fabrics, textiles, papers and other substrates with these core/shell polymers, the so treated articles have improved and superior heat sealable properties, particularly in the case of dielectric heat sealing.

U.S. Pat. No. 3,661,994 discloses a multilayered rubber containing polymer comprising a polymeric core derived from a monomer selected from the group consisting of vinyl chloride, methacrylonitrile, methylmethacrylate, styrene and mixtures thereof and a rubber-type polymer coating said core, said rubber-type polymer being derived from a monomer selected from the group consisting of 1,3-butadiene and the $C_2$-$C_8$ alkyl acrylates and mixtures thereof and a polymeric outer coating derived from a monomer selected from the group consisting of vinyl chloride, methacrylonitrile, methylmethacrylate, styrene and mixtures thereof. The patentee states that these rubber containing polymer particles are useful as high impact plastics and modifiers to reinforce relatively rigid types of plastics.

U.S. Pat. No. 4,385,152 discloses an acrylic polymer emulsion containing as a first polymeric component a core-shell polymer having a core formed from one or more monomers selected from styrene, vinyl acetate, vinyl toluene and acrylic or methacrylic acid esters of alcohols of 1 to 4 carbon atoms and a shell formed of the above monomers in conjunction with one or more monomers selected from acrylic acid or methacrylic acid esters and a minor amount of acrylic or methacrylic acid and as a second polymeric component a polymer composed of a major amount of one ore more monomers selected from styrene, vinylacetate, vinyl toluene and acrylic or methacrylic acid esters and a minor portion of one or more acrylic acid esters with acrylic and/or methacrylic acid. The patentee discloses that these acrylic polymer compositions can be used as coating compositions for various substrates such as wood, metals and cementitious products.

Other core/shell polymers are disclosed, for example, in U.S. Pat. Nos. 4,469,825, 3,291,768 and U.S. Pat. No. 4,468,498, as well as in an article published in Journal of Polymer Science: Polymer Chemistry Edition, Vol. 21, 2845–2861 (1983) entitled "Morphology and Grafting in Polybutylacrylate- Polystyrene Core-Shell Emulsion Polymerization" by T. I. Min, A. Klein, M. S. El-Aasser and J. W. Vanderhoff. The latter article discloses polybutylacrylate-polystyrene (PBA-PS) core-shell latex particles prepared by seeded emulsion polymerization.

In the preparation of films useful for packaging purposes, heat sealable coatings, such as acrylic coatings, are generally coated on one side of the film substrate and another heat sealable coating, such as polyvinylidene chloride (PVDC) is coated on the other side. The acrylic coated side is generally the outside of the web, the side in direct contact with the hot sealer surfaces, where good hot slip and jaw release characteristics are required. The PVDC coating is usually on the inside of the web and provides the high seal strength, good hot tack characteristics and barrier properties required for such packaging. Such a film is disclosed in U.S. Pat. No. 4,403,464. While these films have met with excellent commercial success, improved films, particularly films having improved seal strength and which employ cold seal coatings are still desirable.

SUMMARY OF THE INVENTION

Accordingly, it is one object of the present invention to provide a novel core-shell polymer.

Another object of the invention is to provide a novel core-shell polymer which when coated on a film or paper substrate imparts high cold seal strength, i.e. bonding under only pressure to the film or paper substrate, while also demonstrating improved surface properties, e.g. low surface tack and coating uniformity.

Still another object of the present invention is to provide improved packaging film or coated paper.

A further object of the invention is to provide improved packaging film having high cold seal strength.

These and other objects are achieved herein by providing a core/shell polymer comprising from about 1 to about 50 percent by weight of a rubber core and from about 50 to about 99 percent by weight of a thermoplastic shell comprising, for example, an acrylate/vinyl acetate/methacrylic acid terpolymer. Further objects of the present invention are provided herein by applying the core/shell polymer of the present invention to a packaging film or paper substrate., thereby imparting high cold seal strength properties to the film or paper substrate.

DETAILED DESCRIPTION OF THE INVENTION

The core/shell latex polymer particles of the present invention are prepared by seeded emulsion polymerization. Seeded polymerizations have long been used to produce emulsion particles of a larger size than can be obtained by a regular one-step emulsion recipe. In seeded emulsion processes, successive polymerizations are carried out in the presence of a preformed particle with the result that the original particle is enlarged.

In preparing the new core/shell particles of the present invention, seeded polymerizations are used but, instead of enlargement by the same monomer, a different monomer is employed and multilayer particles of different polymers are thus produced. The seed emulsions which contain the soft or rubbery core polymer particles used in preparing the multilayer particles of this invention are themselves prepared by means of conventional, aqueous emulsion polymerization procedures of either the one-step or seeded type using emulsifiers and water soluble catalysts of the same type, as will be described hereinbelow, for the seeded polymerization step of the subject process. The core/shell polymers of the present invention are prepared by emulsion polymerization of the shell comonomers in the presence of an emulsion of the rubbery core by known techniques.

More particularly, in conducting the seeded polymerization leading to the preparation of the core/shell particles of this invention, an aqueous emulsion containing, for example, from about 1 to about 50% by weight based on the total monomer weight, of the seed polymer particles, having an average particle size of from about 0.02 to about 0.20 microns in diameter, which will ultimately comprise the rubbery core of the multilayered particles, is admixed, for example, with the monomer mixture which will form the outer shell layer said outer shell layer comprising from about 50 to about 99% by weight of the total weight of the core/shell polymer. From about 0.05 to about 0.5% by weight of the total monomer weight of a water soluble catalyst such as, for example, hydrogen peroxide, ammonium, sodium or potassium persulfate or a redox type, such as mixtures of persulfates with alkali metal bisulfites, thiosulfates or hydrosulfites, is introduced and the resulting mixture then heated at a temperature of from about 40° to about 95° C. for a period of about 4 to about 8 hours. The seed polymer emulsion should contain one or more anionic, nonionic or cationic emulsifiers such as, for example, the alkyl carboxylic acid salts, the alkyl sulfate salts, the alkyl sulfonate salts, the phosphoric acid salts, the alkyl sulfonate salts, the alkyl aryl ether alcohols, and the alkyl aryl polyether sulfate salts. The concentration of emulsifier in the seed polymer emulsion is generally about 0.5% by weight of total water. A chain transfer agent, such as isooctylthioglycolate, may also be utilized in the emulsion polymerization, usually in an amount of from about 0.1% to about 0.9% by weight based on the total monomer weight. The emulsion polymerization of the shell comonomers onto the rubbery core is preferably controlled to provide a terpolymer shell with an average molecular weight of from about 20,000 to about 150,000, as determined by gel permeation chromatography (GPC).

The core polymer of the core/shell polymers of the present invention is comprised of a rubber. Typical rubbers which can make up of the core include polyisoprene, polybutene, polychloroprene (neoprene), poly(1,3-butadiene), natural rubber, butadiene/styrene and the like.

The shell layer of the core/shell particles of the present invention has a glass transition temperature of from about −30° C. to about 25° C., preferably 0° C. to 10° C., and comprises a terpolymer polymerized from about 30 to about 80% by weight, of a first monomer selected from the group consisting of ethylacrylate, butylacrylate, hexylacrylate, isooctylacrylate, methylacrylate, vinylidene chloride and mixtures thereof from about 10 to about 60% by weight, of a second monomer selected from the group consisting of vinylacetate, methylmethacrylate, styrene, ethylmethacrylate, isobutylmethacrylate and mixtures thereof and from about 0.1 to about 10% by weight, of a third monomer selected from the group consisting of methacrylic acid, acrylic acid, itaconic acid, sulfoethylmethacrylate, maleic acid and mixtures thereof, all percents by weight based on the total monomer weight, with the proviso that each of said first, second and third monomers are different. The average diameter size of the core/shell polymer particles of the present invention is from about 0.05 microns to about 0.3 microns. Optionally, if desired, the shell layer of the core/shell polymer may also contain a small amount of a multifunctional monomer, such as, for example, ethyleneglycol-dimethylacrylate to provide some crosslinking.

The core/shell emulsion polymerization formulations of the present invention are very useful in imparting high cold seal bond strength to packaging paper or packaging film substrates, particularly polyolefin film, such as polypropylene film substrates. Thus, substrates which are particularly contemplated for use wit the cold sealable core/shell polymers of the present invention include, cast polypropylene, oriented polyropylene, coextruded film, nylon, white opaque film, cellophane, polyesters, high density polyethylene and linear low density polyethylene. It is also contemplated herein the the substrates be uncoated or coated, such as with polyvinylidene chloride or primer and/or be pretreated, such as with, corona discharge, flame or plasma. It has been found herein, as will be substantiated by the data hereinafter, that the core/shell latex adhesive polymers of the present invention when coated on packaging film, such as polyolefin film, impart high cold seal strength by bonding (using only pressure) against the same coated side, good coating uniformity and low tack.

Commonly known techniques can be employed to apply the the core/shell polymer latex of the present invention to the film or paper substrate. For example, when impregnating or saturating the substrate, it may be dipped or sprayed. If the substrate is coated, this may be accomplished by dipping, spraying or by employing a roller, spreading knife, brush or the like. Generally, the core/shell polymer adhesive is applied in an amount of from about 0.5 lb./3000 sq. ft. to about 5 lb./3000 sq. ft. to the film substrate, preferably 3 lb./3000 sq. ft.

The core/shell latex cold sealable coating formulation of the present invention may be compounded with, or have mixed therein, other known ingredients or stabilizers, antifoaming agents, dying adjuvants, pigments, waxes, corn starch, silica, talc and the like or other compounding aids to control surface tack and other surface properties. Thickeners or bodying agents may be added to the polymers so as to control the viscosity of the polymer and thereby achieve the proper flow properties for the particular application desired.

The following Examples are illustrative of the invention.

EXAMPLE 1

A core/shell polymer comprising monomers in polymerized form in the amounts indicated was prepared.

| core | shell |
| --- | --- |
| 37.3, parts by weight, polyiso- | 100, parts by weight, ethyl- |

| core | shell |
|---|---|
| prene seed latex* (average particle size 0.11 microns diameter | acrylate<br>44.8, parts by weight, vinylacetate<br>4.5, parts by weight, methacrylic acid |

*available from GENCORP Company, Akron, Ohio

To 37.3 parts by weight of the polyisoprene seed is added a monomer mixture containing 100 parts by weight ethyl acrylate, 44.8 parts by weight vinylacetate, 4.5 parts by weight methacrylic acid, 0.5 parts by weight of a 10% aqueous ammonium persulfate solution, 149.0 parts by weight water, 0.7 parts by weight isooctylthioglycolate, as a chain transfer agent and 0.7 parts by weight phosphoric sodium salt (Na-Gafac, GAF Corp.), as the emulsifier. Polymerization was carried out at 80° C. for 6 hours. The latex is cooled and filtered through a 25 micron filter. The average molecular weight of the shell layer is in the range of 70,000 to 75,000. The weight ratio of the core to the shell is 3.6 to 96.4 weight percent, respectively.

EXAMPLE 2

A core/shell polymer comprising monomers in polymerized form in the amounts indicated was prepared.

| core | shell |
|---|---|
| 81.6, parts by weight, polyisoprene seed latex* (average particle size 0.11 microns diameter | 100, parts by weight, ethylacrylate<br>44.8, parts by weight, vinylacetate<br>4.5, parts by weight, methacrylic acid |

*available from GENCORP Company, Akron, Ohio

To 81.6 parts by weight of the polyisoprene seed is added a monomer mixture containing 100 parts by weight ethylacrylate, 44.8 parts by weight vinylacetate, 4.5 parts by weight methacrylic acid, 0.5 parts by weight 10% aqueous ammonium persulfate solution, and 115.0 parts by weight water, 0.7 parts by weight isooctylthioglycolate, as a chain transfer agent and 0.7 parts by weight phosphoric sodium salt, as the emulsifier. Polymerization was carried out at 80° C. for 6 hours. The latex is cooled and filtered through a 25 micron filter. The average molecular weight of the shell layer is in the range of 70,000 to 75,000.

EXAMPLE 3

The core/shell polymer formulations prepared in Examples 1 and 2 in comparison with an emulsion polymerized (non-core/shell) terpolymer were tested as cold sealable coatings by pattern applying the formulations by roller to the intended seal portions of one side of a polyvinylidene chloride coated oriented polypropylene film and dried at 210° F. oven temperature. The coating weight was 3 lbs./3000 sq. ft. The cold seal and other coating data are tabulated in Table I.

TABLE 1
RUBBER/ACRYLIC-VAc-MAA CORE/SHELL
EMULSION COPOLYMERIZATION AND RESULTS
ON COLD SEAL COATINGS

|  | Comparative Example A parts by weight | Example 1 parts by weight | Example 2 parts by weight |
|---|---|---|---|
| EA | 100 | 100 | 100 |
| VAc | 45 | 44.8 | 44.8 |
| MAA | 4.5 | 4.5 | 4.5 |
| iOTG | 0.7 | 0.7 | 0.7 |
| Seed latex | — | 37.3 | 81.6 |
| APS | 0.5 | 0.5 | 0.5 |
| $H_2O$ | 192.7 | 149.0 | 115.0 |
| Na-Gafac | 0.9 | 0.7 | 0.7 |
| Temperature (°C.) | 80 | 80 | 80 |
| Reaction time (hr) | 6 | 6 | 6 |
| Crimp Seal strength (g/in) | 570 | 650 | 640 |
| Coating uniformity | good | good | good |
| Surface tack | low | low | low | core/shell latexes
EA: Ethyl acrylate
VAc: Vinyl acetate
MAA: Methacrylic acid
iOTG: Isooctyl thioglycolate
Seed latex: Polyisoprene (GENCORP Company)
APS: Ammonium persulfate
Na-Gafac: Emulsifier (phosphoric sodium salt, GAF Corp.)
Film used for cold seal coating: polyvinylidene chloride oriented polypropylene The above data demonstrate the improved results achieved in accordance with the present invention.

EXAMPLE 4

The core/shell formulations of Examples 1 and 2, in comparison with Comparative Example A (Table 1) and a modified rubber latex (non-core/shell) cold sealable adhesive (Comparative Example B) were roller applied, as described in Example 3, but to uncoated base film, i.e. uncoated oriented polypropylene. The test results are illustrated in Table II.

TABLE II
Crimp Seal Strength For Rubber/Acrylic-VAc-MAA
Core/Shell Polymer Emulsion On Uncoated Oriented Polypropylene Film

|  | LATEX | | | |
|---|---|---|---|---|
|  | Comparative Example A | Example 1 | Example 2 | Comparative Example B |
| seal strength (g/in), initial | 490 | 365 | 370 | 250 |
| seal strength (g/in), after 2 months aging | 390 | 440 | 445 | 350 |
| coating uniformity | good | good | good | fair |
| surface tack | low | low | low | high |

*Latex samples: Comparative Example A, Example 1 and Example 2 as described in Table I; Comparative Example B is composed of modified rubber latex supplied by Findley Adhesives Inc.

Obviously, other modifications and variations of the present invention are possible in the light of the above teachings. It is, therefore, to be understood that changes may be made in the particular embodiments of this invention which are within the full intended scope of the invention as defined by the appended claims.

I claim:

1. A core/shell polymer for an emulsion polymerized latex formulation, comprising from about 1% to about 50% by weight of a rubber core and about 50% to about 99% by weight of a thermoplastic polymer shell based on the total weight of the core/shell polymer, said thermoplastic polymer shell having a glass transition temperature in the range from about −30° C. to about 25° C. comprising a terpolymer polymerized from about 30 to about 80 percent by weight of a first monomer selected from the group consisting of ethylacrylate, butylacrylate, hexylacrylate, isooctylacrylate, methylacrylate, vinylidene chloride and mixtures thereof, from about 10 to about 60 percent by weight of a second monomer selected from the group consisting of vinylacetate, methylmethacrylate, styrene, ethylmethacrylate, isobutylmethacrylate and mixtures thereof and from about 0.1 to about 10 percent by weight of a third monomer selected from the group consisting of methacrylic acid, acrylic acid, itaconic acid, sulfoethylmethacrylate, maleic acid and mixtures thereof, based on the total monomer weight, with the proviso that each of said first, second and third monomers are different.

2. The core/shell polymer of claim 1 wherein said thermoplastic shell has a glass transition temperature in the range of from about 0° C. to about 10° C.

3. The core/shell polymer of claim 1 wherein said rubber core is selected from the group consisting of polyisoprene, polybutene, polychloroprene, poly(1,3-butadiene and butadiene/styrene.

4. The core/shell polymer of claim 1 wherein said rubber core has an average particle size diameter in the range of from about 0.05 to about 0.25 microns.

5. The core/shell polymer of claim 1 wherein said terpolymer has an average molecular weight in the range of from about 20,000 to about 150,000.

6. The core/shell polymer of claim 1 wherein said rubber core comprises polyisoprene and said terpolymer is polymerized from ethylacrylate, vinylacetate and methacrylic acid.

7. The core shell polymer of claim 1 wherein said rubber core is polyisoprene.

8. The core shell polymer of claim 1 wherein said terpolymer further includes a small amount of a multifunctional monomer thereby providing crosslinking.

* * * * *